US009661328B2

United States Patent
McCarthy et al.

(10) Patent No.: US 9,661,328 B2
(45) Date of Patent: May 23, 2017

(54) METHOD OF BIT ALLOCATION FOR IMAGE AND VIDEO COMPRESSION USING PERCEPTUAL GUIDANCE

(71) Applicant: General Instrument Corporation, Horsham, PA (US)

(72) Inventors: Sean T. McCarthy, San Francisco, CA (US); Peter A. Borgwardt, Portland, OR (US); Vijay Kamarshi, Cupertino, CA (US); Shiv Saxena, Portland, OR (US)

(73) Assignee: ARRIS Enterprises, Inc., Suwanee, GA (US)

( * ) Notice: Subject to any disclaimer, the term of this patent is extended or adjusted under 35 U.S.C. 154(b) by 802 days.

(21) Appl. No.: 13/841,865

(22) Filed: Mar. 15, 2013

(65) Prior Publication Data
US 2014/0269903 A1 Sep. 18, 2014

(51) Int. Cl.
*H04N 7/50* (2006.01)
*G06K 9/40* (2006.01)
(Continued)

(52) U.S. Cl.
CPC ......... *H04N 19/124* (2014.11); *H04N 19/126* (2014.11); *H04N 19/14* (2014.11);
(Continued)

(58) Field of Classification Search
CPC .. H04N 7/12; H04N 5/21; H04N 7/50; H04N 7/26244; H04N 7/26085; H04N 7/26079;
(Continued)

(56) References Cited

U.S. PATENT DOCUMENTS

| 5,113,256 A | 5/1992 | Citta et al. |
| 6,014,468 A * | 1/2000 | McCarthy ............... G06F 17/10 382/254 |

(Continued)

FOREIGN PATENT DOCUMENTS

| EP | 1225769 A2 | 7/2002 |
| WO | 9906941 A3 | 10/1999 |
| WO | 2013/115972 A1 | 8/2013 |

OTHER PUBLICATIONS

H.R. Wu, et al., "Digital Video Image Quality and Perceptual Coding", Taylor & Francis Group, Boca Raton, FL. 2006.

(Continued)

*Primary Examiner* — Behrooz Senfi
*Assistant Examiner* — Maryam Nasri
(74) *Attorney, Agent, or Firm* — Thomas A. Ward (57) ABSTRACT

A video processing system is provided to create quantization data parameters based on human eye attraction to provide to an encoder to enable the encoder to compress data taking into account the human perceptual guidance. The system includes a perceptual video processor (PVP) to generate a perceptual significance pixel map for data to be input to the encoder. Companding is provided to reduce the pixel values to values ranging from zero to one, and decimation is performed to match the pixel values to a spatial resolution of quantization parameter values (QP) values in a look up table (LUT). The LUT table values then provide the metadata to provide to the encoder to enable compression of the original picture to be performed by the encoder in a manner so that bits are allocated to pixels in a macroblock according to the predictions of eye tracking.

19 Claims, 10 Drawing Sheets

(51) Int. Cl.

| | |
|---|---|
| *G06T 5/00* | (2006.01) |
| *H04N 19/124* | (2014.01) |
| *H04N 19/176* | (2014.01) |
| *H04N 19/46* | (2014.01) |
| *H04N 19/196* | (2014.01) |
| *H04N 19/593* | (2014.01) |
| *H04N 19/126* | (2014.01) |
| *H04N 19/14* | (2014.01) |
| *H04N 19/154* | (2014.01) |
| *H04N 19/162* | (2014.01) |

(52) U.S. Cl.
CPC ......... *H04N 19/154* (2014.11); *H04N 19/162* (2014.11); *H04N 19/176* (2014.11); *H04N 19/196* (2014.11); *H04N 19/46* (2014.11); *H04N 19/593* (2014.11)

(58) Field of Classification Search
CPC .... H04N 7/26271; H04N 5/217; H04N 19/14; H04N 19/46; H04N 19/126; H04N 19/154; H04N 19/176; G06K 9/40; G06T 5/00

See application file for complete search history.

(56) References Cited

U.S. PATENT DOCUMENTS

| | | | |
|---|---|---|---|
| 6,360,021 | B1 | 3/2002 | McCarthy et al. |
| 7,046,468 | B2 | 5/2006 | Yamashita et al. |
| 8,767,127 | B2 | 7/2014 | McCarthy et al. |
| 2009/0074075 | A1* | 3/2009 | Au .................. H04N 19/142 375/240.22 |
| 2010/0265404 | A1* | 10/2010 | McCarthy ............. G06T 5/002 348/607 |
| 2013/0148731 | A1 | 6/2013 | McCarthy et al. |
| 2013/0195206 | A1 | 8/2013 | McCarthy |

OTHER PUBLICATIONS

Z. Wang, et al., "Mean Squared Error: Love It or Leave It?", IEEE Signal Processsing Magazine (98), Jan. 2009, pp. 98-117.
PCT Search Report & Written Opinion, RE: Application #PCT/US2014/019722; dated Jun. 4, 2014.
Z. Li, et al., "Visual attention guided bit allocation in video compression" Image and Vision Computing, Elsevier, Guildford, vol. 29, No. 1; Jan. 1, 2011, pp. 1-14.
Hai Bing Yin, et al., "Adaptive quantization in perceptual MPEG video encoders", Proceedings 2006/ 25th Picture Coding Symposium, Apr. 24, 2006.

* cited by examiner

METHOD OF BIT ALLOCATION FOR IMAGE AND VIDEO COMPRESSION USING PERCEPTUAL GUIDANCE

BACKGROUND

Technical Field

The present invention relates to a method of video data compression to allocate pixels based on human eye attraction to particular areas of the picture.

Related Art

The quality of a video image is ultimately determined by a human viewer of the video image pictures. Allocation of pixels during video compression is based on maintaining the quality of the video image as determined by the human viewer. Video images can be enhanced for compression by considering areas of a picture where no motion has occurred, or where the pixels of a large portion of the picture are uniform. It is further desirable to increase the compression of pixels in video images even in portions that include difficult-to-track visual details. However, it is difficult to accurately identify difficult-to-track visual details. If important details in the video image are removed, the end user will perceive a degradation in video quality.

The efficiency of video compression techniques performed by an encoder are limited without an accurate method of allocating bits based on a reliable perceptual mode. Existing image and video compression standards used by encoders rely on ad hoc assumptions about what kinds of details are visually important, and do not model the way in which the visual importance of image and video details are impacted by human eye attraction. In particular, existing encoders do not model the way in which the visual importance of image and video details is impacted by spatial context or temporal factors. Further, existing encoders do not analyze content prior to compression so as to provide data compression to allocate bits more efficiently.

SUMMARY

Embodiments of the present invention provide a system to create quantization parameters based on human eye attraction to provide to an encoder to enable the encoder to compress data taking into account human perceptual guidance. The video data is provided directly to the compressor so that cleaning of data prior to encoding is not necessary.

According to an embodiment, the system includes a quantization data processor for providing quantization metadata to an encoder to enable the encoder to control compression based on human eye tracking data. The quantization data processor can be a perceptual video processor (PVP) that uses human eye tracking information to determine the quantization data. In one embodiment, the quantization data processor is configured to determine the quantization data by performing the following steps: receiving an original input picture; obtaining a perceptual significance pixel map for the original input picture using predictions of eye tracking; providing an absolute value for numbers in the significance pixel map; performing companding to reduce the determined absolute value of the pixel values to values ranging from zero to one; performing decimation on the companded values to match a spatial resolution of QP values to be encoded; determining quantization parameters for the pixels provided from the decimation from a quantization parameter (QP) look up table (LUT); providing the QP LUT table values as metadata to an encoder to enable compression of the original picture to be performed by the encoder in a manner so that bits are allocated to pixels in a macroblock according to the predictions of eye tracking.

In further embodiments of the present invention, an infinite impulse response (IIR) filter is provided to modify the companded pixel values prior to performing decimation. The IIR filter looks at a previous picture to the picture being encoded and creates a more gradual change from the previous picture.

In a further embodiment, a motion compensation difference operation is provided between a reference picture and an original input picture provided to the decoder. A perceptual significance pixel map is provided both for the reference picture and the output of the motion compensated difference picture and a difference is taken between the signals to provide an input to the absolute value portion of the PVP in the process described above. In one embodiment, the perceptual significance pixel map is provided prior to motion compensation of the reference and input pictures, while in another embodiment the significance map is created after motion compensation.

BRIEF DESCRIPTION OF THE DRAWINGS

Further details of the present invention are explained with the help of the attached drawings in which.

DETAILED DESCRIPTION

Embodiments of the invention provide for use of a human eye attraction mapping to be used to enhance the picture quality for video data being encoded. In previous systems, the eye attraction mapping was used to clean pictures for processing in an encoder. In a second version that are the subject of embodiments of the present invention, the eye attraction mapping is performed to enable generation of quantization need metadata that is provided to an encoder to enable encoding of the data in a manner that allocates more bits to areas of a picture where a human eye is naturally attracted, while less bits are provided in other areas. In the second version any picture can be provided to the encoder, and cleaning is not needed.

A. Using Perceptual Guidance to Clean a Picture Prior to Encoding

Figure 1:
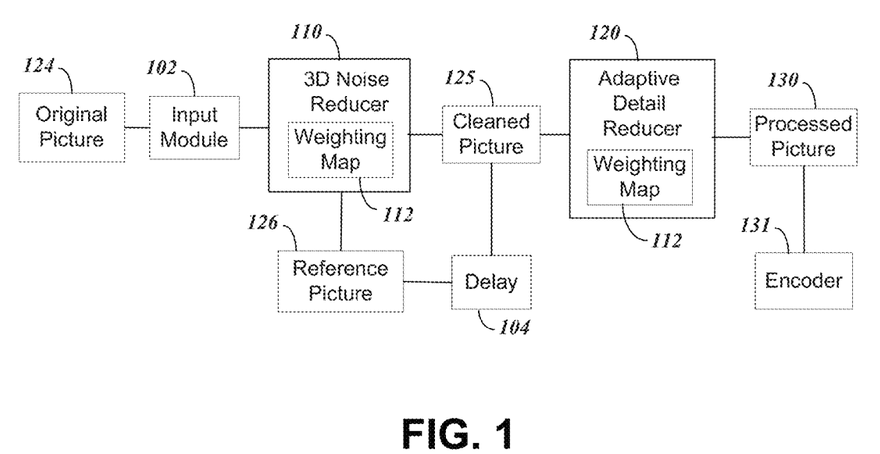
FIG. 1 illustrates a block diagram for a system for reducing noise in video processing.

FIG. 1 shows a block diagram of a system 100 for reducing noise in video processing that provides for cleaning of the picture prior to compression in an encoder. The system 100 includes an input module 102, a three dimensional noise reducer (3DNR) 110 and an adaptive detail reducer (ADR) 120. The input module 102 is configured to receive an original picture 124 in a video sequence. The 3DNR performs three dimensional noise reduction on the original picture 124 in two spatial dimensions and a temporal dimension. The ADR 120 performs adaptive detail reduction on the original picture 124 on selected difficult-to-track details. The systems described in this section A are detailed in U.S. patent application Ser. No. 12/761,581, filed Apr. 16, 2010, entitled "System For Reducing Noise In Video Processing" incorporated by reference herein in its entirety.

The system 100 uses a weighting map 112 to form a processed picture 130 from the original picture 124. The weighting map 112 is created by the system 100 using a model of the human visual system that takes into account the statistics of natural images and the response functions of cells in the retina. The weighting map 112 is a pixel map of the original picture 124 based on the model of the human visual system. The weighting map 112 may include a value or weight for each pixel identifying a level of difficulty for visual perception and/or a level of difficulty for compression. The level of difficulty for compression may be a continuous scale measuring the number of bits needed to encode the pixel or area of the image. Similarly, the level of difficulty for visual perception is a continuous scale measuring the number of bits needed to encode the pixel or area of the image.

Different weighting maps 112 may be used in the 3DNR 110 and the ADR 120. For instance, the system 100 may be configured to use the weighting map 112 and the 3DNR 110 to reduce noise in the original picture 124 and thereby form the processed picture 130. Additionally or alternately, the system 100 may reduce difficult-to-track details in the original picture 124 using the weighting map 112 and the ADR 120 to form the processed picture 130. The difficult-to-track details may be determined using a predetermined threshold based on the weighting map 112.

Figure 4:
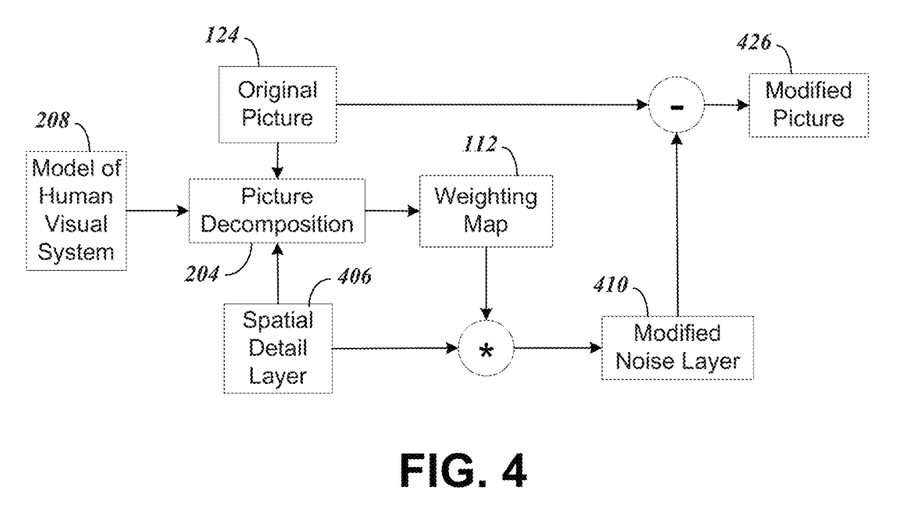
FIG. 4 shows a data flow diagram of an adaptive detail reducer.

The processed picture 130 may comprise a cleaned picture 125 after processing by the 3DNR 110 as described below with respect to FIG. 2, a modified picture after processing by the ADR 120 as described below with respect to FIG. 4, or a cleaned and modified picture after processing by the 3DNR 110 and the ADR 120. The cleaned picture 125 includes reduced amounts of noise while a modified picture includes reduced amounts of adapted details. The adapted details are important features, such as faces and edges that are preserved by the ADR 120 and are determined to be useful for perceiving the image.

The system 100 uses a reference picture 126 to clean or modify the original picture 124. The reference picture 126 may include a picture that has previously been processed by the system 100, for instance the cleaned picture 125 from a preceding original picture 124 in the video sequence. Alternately, the reference picture 126 may comprise an unprocessed picture.

The system 100 uses the information to selectively reduce noise and difficult-to-track details with minimal introduction of noticeable processing artifacts. In addition, processes used in the system 100 use the weighting map 112 to reduce and/or eliminate artifacts such as motion blur, motion discontinuities, and artificial-looking edges. The system 100 reduces perceptual masking and may be used to avoid smearing. The 3DNR 110 may be configured to extract a noise layer, thereby performing auto adapting noise reduction for the video sequence, and the ADR 120 may be used to extract a spatial layer, thereby performing adaptive detail reduction for the video sequence. The 3DNR 110 and the ADR 120 are fully separable and the system 100 may comprise a single 3DNR 110, the operation of which is described with respect to FIG. 2 below, or a single ADR 120, the operation of which is described with respect to FIG. 4 below.

Figure 2:
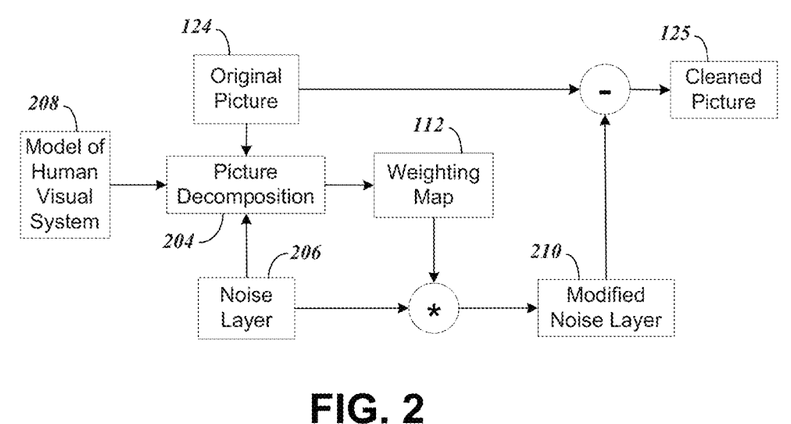
FIG. 2 shows a data flow diagram of a 3D noise reducer.

FIG. 2 illustrates a data flow diagram 200 for the 3DNR 110. The original picture 124 is decomposed using picture decomposition 204 into a noise layer 206 and a weighting map 112. The picture decomposition 204 uses the model human visual system 208 to determine a pixel map based on the original picture 124.

The model of the human visual system 208 may include a model of human spatial perceptibility and a model of human temporal perceptibility. The model of the human visual system used in creating the weighting map 112 is an integrated perceptual guide (IPeG) system, described in more detail in U.S. Pat. No. 6,014,468 entitled "Apparatus and Methods for Image and Signal Processing," issued Jan. 11, 2000, U.S. Pat. No. 6,360,021 entitled "Apparatus and Methods for Image and Signal Processing," issued Mar. 19, 2002, U.S. Pat. No. 7,046,857 entitled "Apparatus and Methods for Image and Signal Processing," a continuation of U.S. Pat. No. 6,360,021 issued May 16, 2006, and International Application PCT/US98/15767, entitled "Apparatus and Methods for Image and Signal Processing," filed on Jan. 28, 2000, which are incorporated by reference in their entireties. The IPEG system provides information including a set of signals that organizes visual details into perceptual significance, and a metric that indicates the ability of a viewer to track certain video details.

The noise layer 206 includes a value for each pixel based on the model of human spatial perceptibility. For instance, the noise layer 206 may be determined using Equation (1): $N(i,j)=E(i,j) \cdot P_N(i,j)$, in which i, j are the pixel coordinates of the N pixels in the image area being processed, E(i, j), a pixel map of spatial detail layer values forming the spatial detail layer 304, and P(i, j) are P-functions that are inputs to calculating the weighting maps 112. A P-function for the noise layer 206 may be determined using Equation (2): $P_N(i,j)=\exp(-|E(i,j)|/\lambda_N)$.

Parameters denoted as lambdas ($\lambda$) are tuning parameters that are used to change an overall strength of the 3DNR 110 and the ADP 120. For instance, six strength-levels ("strongest", "strong", "medium", "weak", "weakest", and "disabled") may be provided for the 3DNR 110 and the ADP 120, independently. Each strength-level is associated with a set of lambda values and alpha values (which are the on and off rates of the asymmetric IIR). The service provider empirically selects the default lambda values for each strength-level in a way that helps customers meet video quality and bit rate needs. The values associated with 3DNR 110 and ADP 120 may be customized to provide more control. Continuously valued functions may be used to generate the P-functions, provide opportunities for customization, and avoid visual distortions that may arise near the boundaries of the "all-or-none" decisions imposed by threshold operations. The subscript n for the P-function refers to the noise layer 206.

The weighting map 112, W(i,j), includes a value for each pixel based on the model of human temporal perceptibility. After decomposition, the noise layer 206 is recombined with the weighting map 112 to form a modified noise layer 210. The modified noise layer 210 is subtracted from the original picture 124 to produce a cleaned picture 125.

Figure 3:
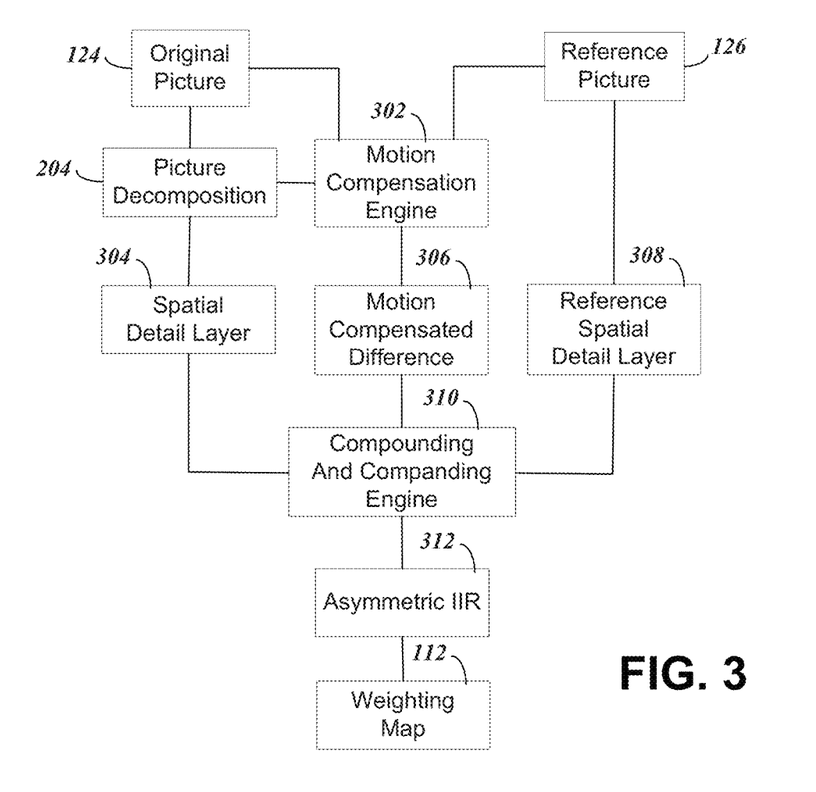
FIG. 3 illustrates perceptual masking and preservation using the 3D noise reducer.

The 3DNR 110 may be used for perceptual masking and preservation, as shown with respect to FIG. 3. The P-function for perceptual masking may be determined using Equation (3): $P_S(i,j)=\exp(-|E(i,j)|/\lambda_S)$. Perceptual video identifies parts of vision that human retina sees that are of low impact to perception of image and allows the system 100 to reduce the corresponding low impact parts of image so that there is a reduced amount of data to encode. The subscript s for the P-function refers to the spatial detail layer 304.

As shown in FIG. 3, the original picture 124 may be provided to the picture decomposition 204 to determine the spatial detail layer 304. For instance, the spatial detail layer 304 may be determined using Equation (4): $E(i,j)=(Y(i,j)-\overline{Y})-B(i,j)$, in which Y(i,j) is the pixel map of luma values, and $\overline{Y}$ is a mean value of the pixel map of luma values that may be determined by Equation (5):

$$\overline{Y} = \frac{\sum_{i,j} Y(i,j)}{N}.$$

Luma values represent brightness in an image and are known to be paired with chroma values, which convey color information, to convey an image. B(i,j) is a pixel map of basal layer values. N refers to a total number of pixels in the pixel map. The basal layer may be determined using Equation (6): $B(i,j)=h(k,l) \otimes (Y(i,j)-\overline{Y})$, in which h(k,l) is a convolution kernel generated from an IPeG transform.

The original picture 124 along with a reference picture 126 may also be provided to a motion compensation engine 302. The motion compensation engine 302 thereafter determines a motion compensated difference 306 between the original picture 124 and the reference picture 126. For instance, the motion compensation engine 302 may determine motion compensation errors using Equations (7) through (9):

$$D_Y(i,j)=Y(i,j)-Y_{MC}(i,j)$$

$$D_U(i,j)=U(i,j)-U_{MC}(i,j)$$

$$D_V(i,j)=V(i,j)-V_{MC}(i,j)$$

in which U(i,j) and V(I,j) are the pixel maps of chroma values. A P-function for the motion compensation error may be determined using Equation (10):

$$P_D(i,j) = \exp\left(-\sqrt{(|D_Y(i,j)|^2 + a_U \cdot |D_U(i,j)|^2 + a_V \cdot |D_V(i,j)|^2)} \Big/ \lambda_S\right).$$

Thereafter, a P-function for the 3DNR 110 may be determined using Equation (11): $P_{3DNR}(i,j)=P_D(i,j) \cdot P_S(i,j) \cdot P_{S,REF}(i,j)$.

The motion compensated difference 306, the spatial detail layer 302, and a reference spatial detail layer 308 of the reference picture 126 may all be provided to a compounding and companding engine 310. The result of processing of the picture using the compounding and companding engine 310 may be provided to an Asymmetric (infinite impulse response) IIR 312 with scene-change reset operation.

Thereafter the Asymmetric IIR 312 forms the weighting map 112. The weighting map 112 for the 3DNR 110 may be determined using Equation (12):

$$W_{3DNR}(i,j)=W_{3DNR,REF}(i,j)+\alpha(i,j) \cdot (P_{3DNR}(i,j)-W_{3DNR}(i,j)).$$

$\alpha(i,j)$ for the 3DNR 110 may be determined by the Asymmetric IIR 312 using Equation (13):

$$\alpha(i,j) = \begin{cases} \alpha_{3DNR,ON}; & P_{3DNR}(i,j) > W_{3DNR}(i,j) \\ \alpha_{3DNR,OFF}; & P_{3DNR}(i,j) < W_{3DNR}(i,j) \end{cases}.$$

The motion compensated difference 306 between the original picture 124 and the reference picture 126 may be determined using motion vectors. The motion compensated difference 306 may be determined on a pixel by pixel basis and is used to measure a difference between the original picture 124 and the reference picture 126. Some parts of the difference between the original picture 124 and the reference picture 126 may comprise areas of edges that need to be preserved while other parts may comprise noise that may be removed without affecting perception of the image. The spatial detail layer 304 supplied for the original picture 124 and the reference spatial detail layer 308 supplied for the reference picture 126 are used to identify areas that are not perceptually significant. The weighting map 112 used by the 3DNR 110 combines the spatial layers to reduce noise while preserving perceptually significant details i.e. details that are important from a feature point of view.

For instance, a noise estimate may be determined using Equation (14): $\hat{N}(i,j)=[1-b \cdot (1-W_{3DNR}(i,j))] \cdot N(i,j)$, in which b is a constant. Thereafter the 3DNR 110 may determine a cleaned 3DNR image using Equation (15): $Y_{3DNR}(i,j)=Y(i,j)-\hat{N}(i,j)$.

Figure 5:
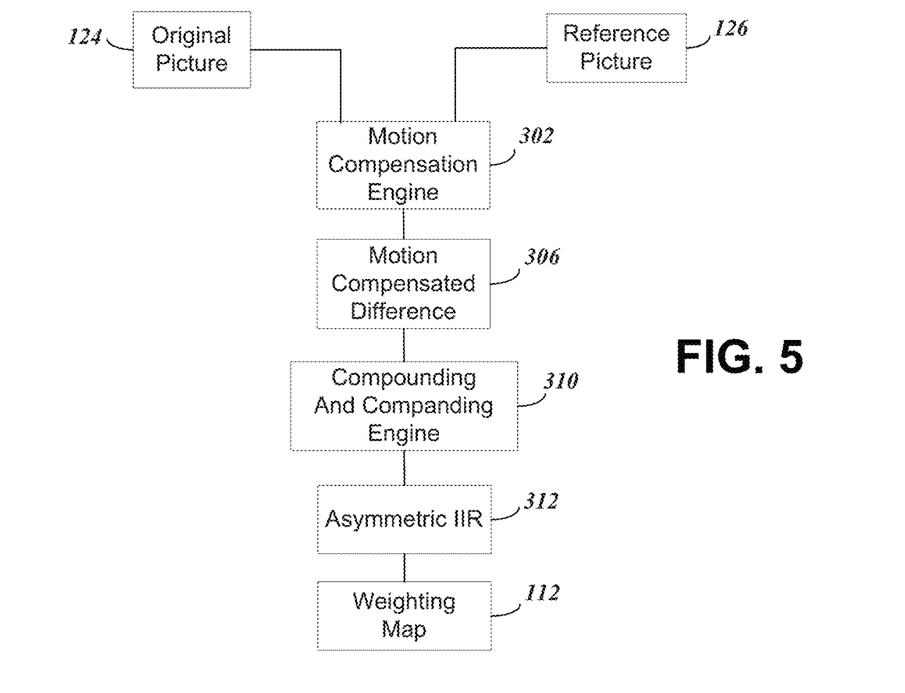
FIG. 5 illustrates perceptual masking and preservation using the adaptive detail reducer.

Turning now to FIG. 5, the operation of the ADR 120 is further illustrated. The original picture 124 is decomposed using the picture decomposition 204 into a spatial detail layer 302 and the weighting map 112. The spatial detail layer 406 includes a value for each pixel based on a model of human spatial perceptibility. The weighting map 112 includes a value for each pixel based on a model of human temporal perceptibility. After decomposition, the spatial detail layer 406 is recombined with the weighting map 112 to form a modified detail layer 410. The modified detail layer 410 is subtracted from the original picture 124 to produce a modified picture 426.

The ADR 120 may also be used for perceptual masking and preservation, as shown with respect to FIG. 5. The original picture 124 may be provided to the picture decomposition 204 to determine the spatial detail layer 304. For instance, the ADR 120 may determine a P-function for high-energy spatial detail using Equation (16): $P_A(i,j)=1-\exp(-|E(i,j)|/\lambda_A)$. Similarly, a P-function for difficult-to-track high-energy detail may be determined using Equation (17): $P_{ADP}(i,j)=(1-P_D(i,j)) \cdot P_A(i,j)$.

The original picture 124 along with a reference picture 126 may also be provided to the motion compensation engine 302. The motion compensation engine 302 thereafter determines a motion compensated difference 306 between the original picture 124 and the reference picture 126. The motion compensated difference 306 may be provided to a compounding and companding engine 310. The result of processing of the picture using the compounding and companding engine 310 may be provided to an Asymmetric (infinite impulse response) IIR 312 with scene-change reset operation.

Thereafter the Asymmetric IIR 312 forms the weighting map 112. The weighting map 112 for the ADR 120 may be determined using Equation (18):

$$W_{ADP}(i,j)=W_{ADP,REF}(i,j)+\alpha(i,j)\cdot(P_{ADP}(i,j)-W_{ADP}(i,j)).$$

$\alpha(i,j)$ for the ADR 120 may be determined by the Asymmetric IIR 312 using Equation (19):

$$\alpha(i,j) = \begin{cases} \alpha_{ADP,ON}; P_{3DNR}(i,j) > W_{3DNR}(i,j) \\ \alpha_{ADP,OFF}; P_{3DNR}(i,j) < W_{3DNR}(i,j) \end{cases}.$$

The reference picture 126 may comprise a previous cleaned picture 125 in the video sequence from the 3DNR 110. Alternately, the reference picture 126 may comprise a previous modified picture 426 in the video sequence from the ADR 120. However, in instances where the previous modified picture 426 is used, a motion mismatch may be introduced that increases spatial detail reduction and adds a second-order temporal dependence. By using the previous cleaned picture 125 in the video sequence from the 3DNR 110, the ADR 120 follows the unpredictable difference between the original picture 124 and the reference picture 126 as closely as possible so that unpredictability is reduced for the encoding process. Use of the previous modified picture 426 as the reference picture 126 effectively introduces an artificial unpredictability.

The ADR 120 may process the original picture 124 to selectively attenuate details that are simultaneously difficult-to-perceive and difficult-to-compress, to preserve important features (e.g., faces, edges), and to avoid blurring. For instance, difficult-to-track high-energy detail may be determined using Equation (20): $\hat{S}(i,j)=W_{ADP}(i,j)\cdot E(i,j)$. Thereafter the ADR 120 may determine an ADP image using Equation (21): $Y_{ADP}(i,j)=Y(i,j)-\hat{S}(i,j)$.

Increased compression efficiency improvement on high-energy background motion, e.g. up to 50%, may preferably be obtained. The ADR 120 subtracts the unpredictable high-energy detail from the original picture 124. More specifically, the ADR 120 extracts a spatial detail layer, accounts for perceptual masking and may be used to avoid blurring. The ADR 120 uses the spatial layers and temporal error layers, which may be created through motion estimation, to perform perceptual masking and preservation. The ADR 120 may determine a number from zero to one for each pixel in the layers and overlay the spatial layers and temporal error layers, using different areas to do different types of processing.

The ADR 120 uses the motion compensated difference 306 in the compounding and companding engine 310 to map an absence of difference in the temporal error layer for each pixel using a weighting function. The motion compensated difference 306 at a motion estimation stage may range from one to 255, with a size of difference indicating whether a pixel is a candidate for a poor prediction. The weighting function may comprise P-function maps that indicate a range from a relatively good prediction to a relatively bad prediction on a scale of zero to one for the motion compensated difference 306. Small errors map linearly to the P-function maps, while large errors map non-linearly to the P-function maps.

The motion compensated difference 306 is determined in a range of values from zero to one on a compression scale by the compounding and companding engine 310. The compounding and companding engine 310 uses a non-linear companding scale and adds to two other P-functions. Each of the P-functions indicates parts of the original picture 124 that tend to be of high significance and easily tracked and parts of the reference picture 126 that tend to be of high significance and easily tracked as still images. The two images are multiplied together and used to map areas of the difference map where there is a higher probability of inaccurate prediction. The resulting weighting map 112 is a composite map that ranges from near zero when details are easy to track and easily predicted to one when details are either not easy to track, not easily predicted or a combination of not easy to track and not easily predicted. The weighting map 112 may be used to highlight areas which are of low perceptual significance and probably poorly predicted.

Example of methods in which the system 100 may be employed for reducing noise in video processing will now be described with respect to the following flow diagram depicted in FIG. 6.

Figure 6:
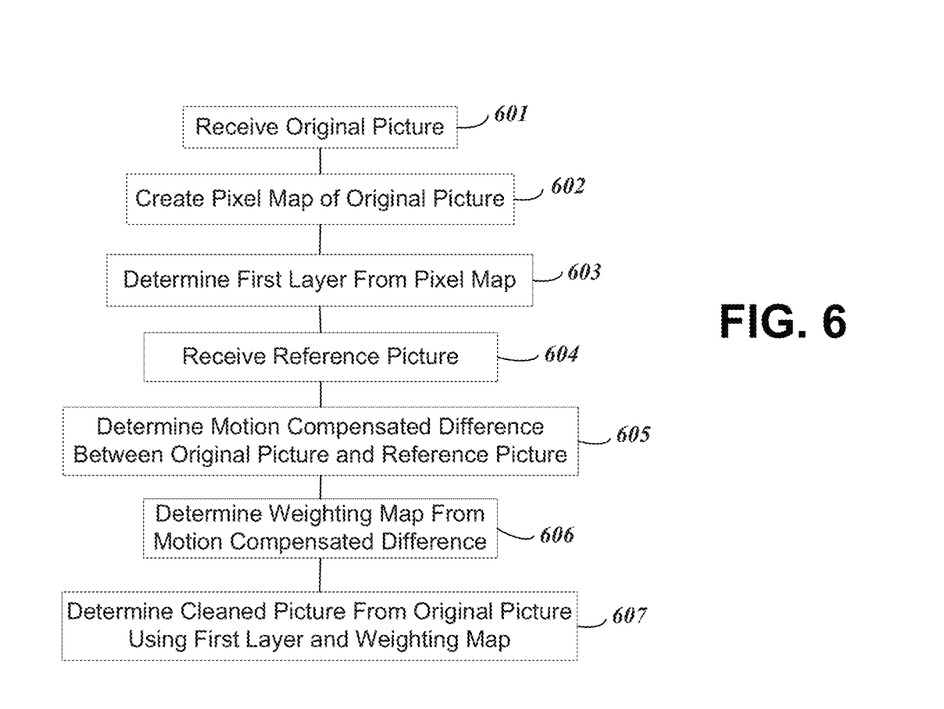
FIG. 6 illustrates a flow diagram of a method of reducing noise in video processing.

At step 601, as shown in FIG. 6, the system 100 receives an original picture 124 at the input module 102 of the system 100. For instance, the original picture 124 may be a picture in a video sequence processed by a service provider, while the system 100 may compromise an encoding system in a cable head end.

At step 602, the system 100 creates a pixel map using a model human visual system and the picture decomposition 204. For instance, the original picture 124 may be represented in dual form as an IPEG signal using an IPEG system for the model human visual system and performing an IPEG decomposition using the picture decomposition 204. The system 100 creates the pixel map in a parallel model. The original picture 124 is mapped pixel by pixel as it would be mapped in a human retina. The IPEG decomposition stratifies the mapped original picture 124 in terms of high perceptual detail features and low perceptual detail features.

At step 603, the system 100 determines a first layer from the pixel map using the picture decomposition 204. The first layer is a noise layer 206 determined by the system 100 using the 3DNR 110. The noise layer 206 includes a value for each pixel based on the model human visual system. For instance, parts of the mapped original picture 124 that are low perceptual detail features and cannot be predicted to a predetermined level of accuracy through motion compensation become candidates for noise. Parts of the original picture 124 where motion cannot be predicted to the predetermined level of accuracy will be difficult-to-compress. The difficult-to-compress may be determined based on a predetermined scale or on a relative basis with regard to other parts of the original picture 124.

The first layer is a spatial detail layer 406 determined by the system 100 using the ADR 120. The spatial detail layer 406 includes a value for each pixel based on a model of human spatial perceptibility.

At step 604, the input module 102 receives a reference picture 126. The reference picture 126 may include a previously cleaned picture 125 in the video sequence from the 3DNR 110. The reference picture 126 may also include a previously modified picture 426 in the sequence from the ADR 120.

At step 605, the system 100 determines a motion compensated difference 306 between the original picture 124 and the reference picture 126. For instance, the system 100 may determine the motion compensated difference 306 using a motion compensation engine 302.

At step 606, the system 100 determines a weighting map 112 from the motion compensated difference between the original picture 124 and the reference picture 126. For instance, the system 100 may create the weighting map 112 using a scale of zero to one representing whether energy in a part of the picture is likely to be due to noise or something that can be perceived and compressed easily.

At step 607, the system 100 determines a processed picture from the original picture 124 using the weighting map 112 and the first layer. The determined processed picture is a cleaned picture 125 and the first layer used to determine the cleaned picture 125 is a noise layer. The system 100, more particularly the 3DNR 110, forms a modified noise layer 210 using the noise layer 206 and the weighting map 112. The 3DNR 110 includes a value for each pixel in the modified noise layer 210 based on a model of human perceptibility. The 3DNR 110 determines the cleaned picture 125 by subtracting pixels in the modified noise layer 210 from pixels in the original picture to eliminate data that is difficult-to-compress and difficult-to-perceive.

B. Encoder Bit Allocation Based on Quantization Need Data Using Perceptual Guidance FIG. 7 and subsequent figures illustrate a system where quantization parameters are provided to a encoder to enable the encoder to compress data to take into account human perceptual guidance. The video data is provided directly to the compressor in these subsequent embodiments and cleaning of the data as in systems described with figures prior to FIG. 7 is not necessary.

Figure 7:
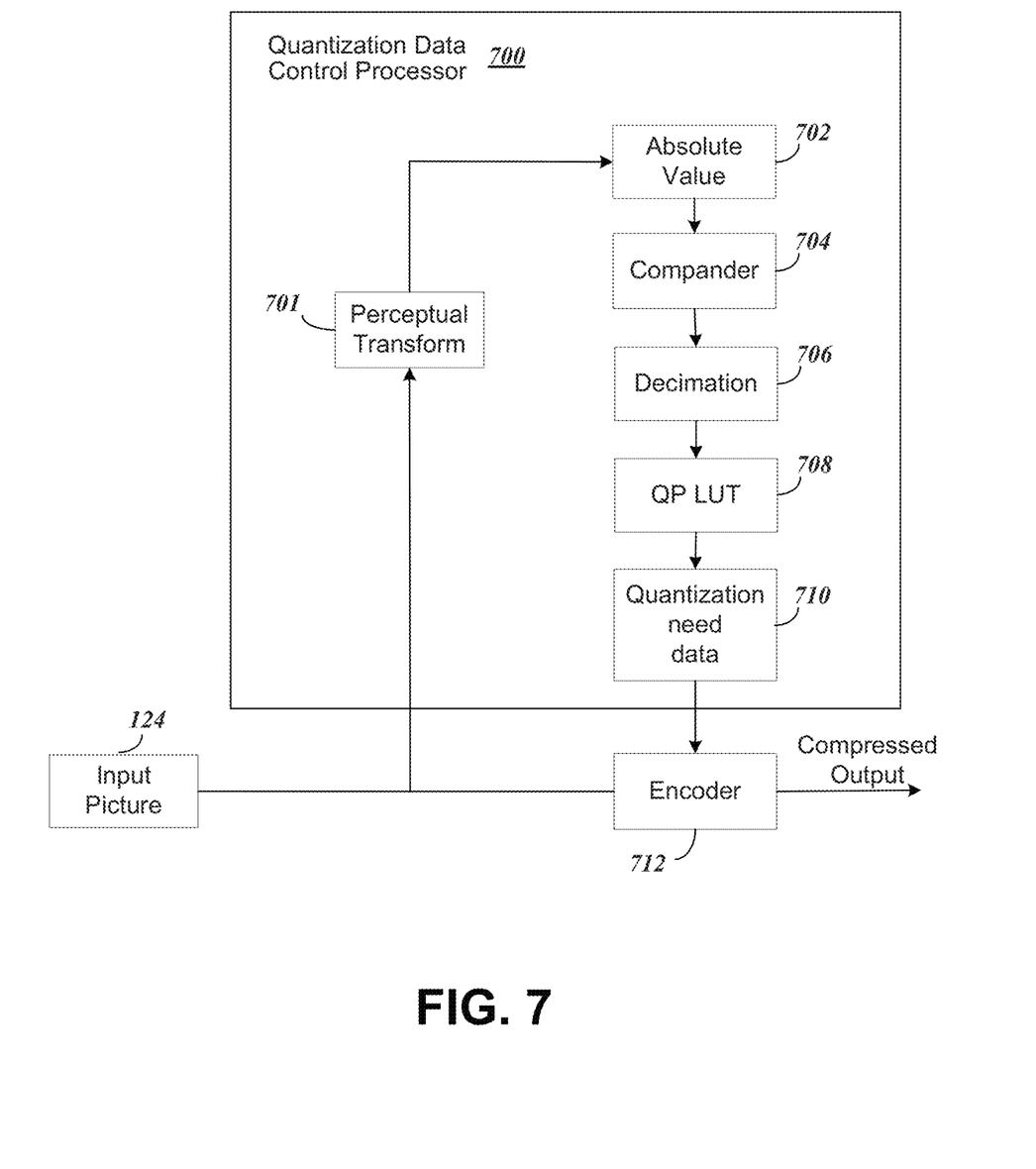
FIG. 7 shows components of a first embodiment of a system to determine quantization need data based on human perceptual guidance to control encoding.

FIG. 7 shows components of a first embodiment of a system to determine quantization need data based on human perceptual guidance to control encoding. The system receives an original input picture 124 that will be input to encoder 712 as well as a quantization data control processor 700. The quantization data control processor 700 will generate the quantization need data signals that could be used to control compression in the encoder 712.

The control processor includes a perceptual transform block 701 that receives the input picture. The perceptual transform block 701 applies a model of the human visual system 208 that may include a model of human spatial perceptibility and a model of human temporal perceptibility. One non-limiting example of a process performed by the perceptual transform block 701 is the integrated perceptual guide (IPeG) that uses a model of the human visual system in creating the weighting map 112, which is described in more detail in U.S. Pat. Nos. 6,014,468, 6,360,021, and 7,046,857 referenced previously. The IPeG system provides information including a set of signals that organizes visual details into perceptual significance, and a metric that indicates the ability of a viewer to track certain video details.

In one embodiment the IPeG eye tracking map can be generated in a Perceptual Video Processor (PVP) plug-in module. An example of such a PVP is the SE6601 manufactured by Motorola Mobility, Inc. In one embodiment, the PVP uses a spatial temporal "P function" of an Adaptive Detail Preservation process described in U.S. patent application Ser. No. 12/761,581 (having attorney docket no. BCS05793). The PVP can make up a part of the perceptual transform block 701, or be provided from a separate processor from one or more other processors providing functions within the overall quantization data control processor 700. One feature in one embodiment of the present invention is that the eye tracking data generated in a PVP can then be transferred to these other processing elements.

The PVP and other processors can be provided in the present invention with a memory that is included to store code to enable the processors to operate to provide the functions described subsequently to generate quantization data. The PVP can be provided with the memory and encoder on a single integrated circuit, or each component can be provided separately.

With the original input picture 124 represented as Y pixel values, the perceptual transform block 702 creates a spatial detail map eY. The absolute value block 702 then provides an absolute value of the numbers in the spatial detail map |eY|. Next the compander block 704 arranges the detail map values with a signal between 0 and 1 in a compressed range. In one example, the companded pixel values can be determined as pY as follows:

$$pY=1-\exp(-|eY|/(CF*\text{lambda}Y))$$

wherein CF=a companding factor and lambdaY=mean value of |eY|.

The values from the compander 706 are next provided to the decimation block 708. The decimation block 708 accumulates the data from the companding signal to fit the parameters of the encoding system. For example, in one embodiment, the encoder selects a single QP value for each 16×16 macroblock of pixels in the input data, the decimator would then convert each corresponding 16×16 block of companded spatial detail values to a quantization-need value so that there would be a one-to-one mapping between quantization-need values and QP values. In one embodiment, the decimator converts values by averaging.

Next, the values from the decimation block 708 are used to find values from a quantization parameter (QP) look up table (LUT). The QP LUT values are metadata in one embodiment that are created based on studies of human visual data that can be used to control data compression in an efficient manner where bits are allocated to pixels that the human eye is normally attracted toward. Data compression can then be provided in an efficient manner while high quality pictures are provided according to human visual perception.

The data from the QP LUT in block 708 are then provided as quantization need-data values using quantization-need data block 710 to the encoder 712. The encoder 712 uses the quantization need-data values or metadata to control data compression.

The procedure described with respect to FIG. 7 differs from previous procedures which provided perceptual transforms based on human visual data to clean up pixel information directly in the picture before the picture was provided to the encoder 712. Previous encoders selected QP values (quantization values) for the pictures based on one of several metrics, such as: 1) the sum-of-absolute difference (SAD) between a predicted picture and a reference picture (which is used as an indicator of predictability); 2) the block-by-block Hadamard transform of an input picture (which is used as an indicator of compressibility). In these previous cases, the selection of a QP value occurs within the encoding loop. In embodiments of the invention, an indicator of eye tracking is created external from the encoding loop but for use within the encoding loop and cleaning of the picture prior to encoding is not required.

Figure 8:
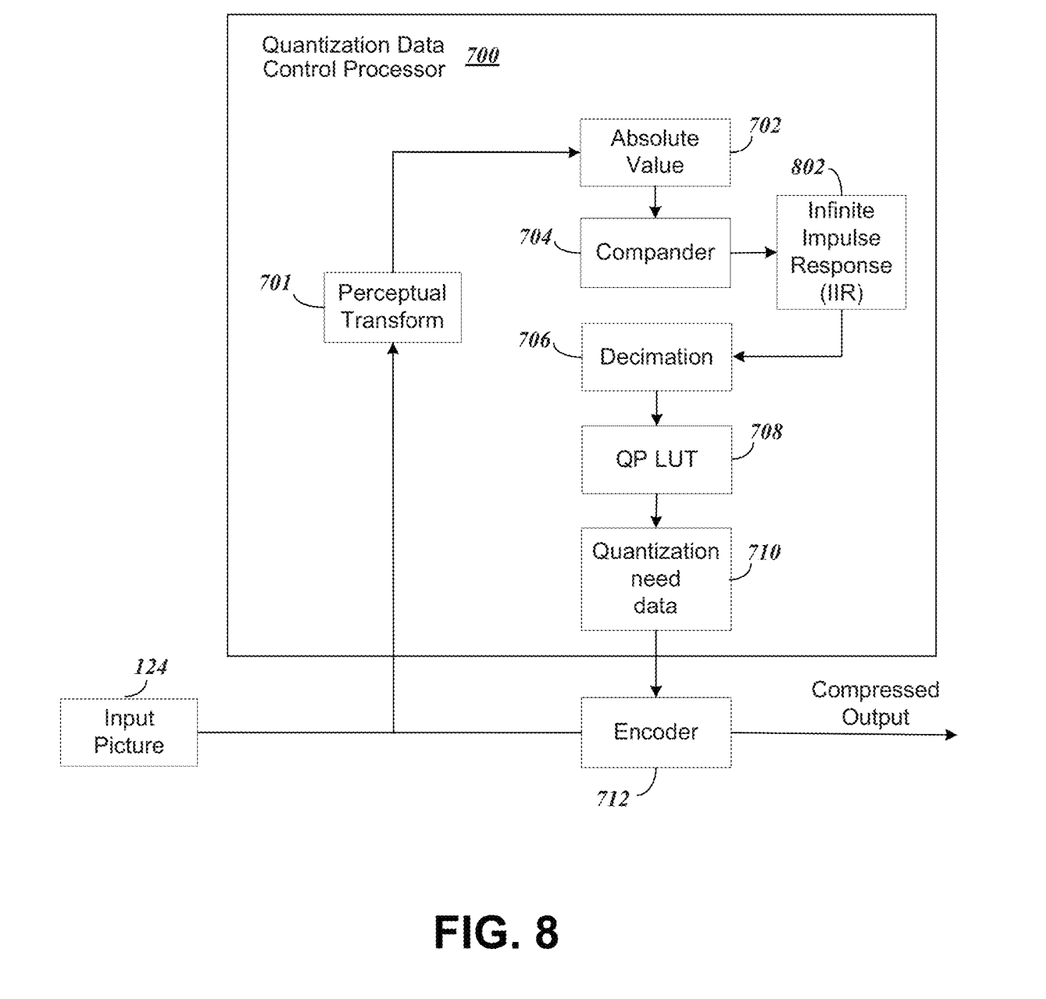
FIG. 8 shows modifications to the system of FIG. 7 to provide an infinite impulse response (IIR)

FIG. 8 shows modifications to the system of FIG. 7 to provide an infinite impulse response (IIR) block 802 to modify the companded pixel values from block 704 prior to performing decimation in block 708. The IIR block 802 looks at a previous picture to the picture being encoded and creates a more gradual change from the previous picture. In one embodiment all of the calculations performed in the perceptual transform block 701, compander 704 and absolute value block 702 can be performed in a PVP.

Figure 9:
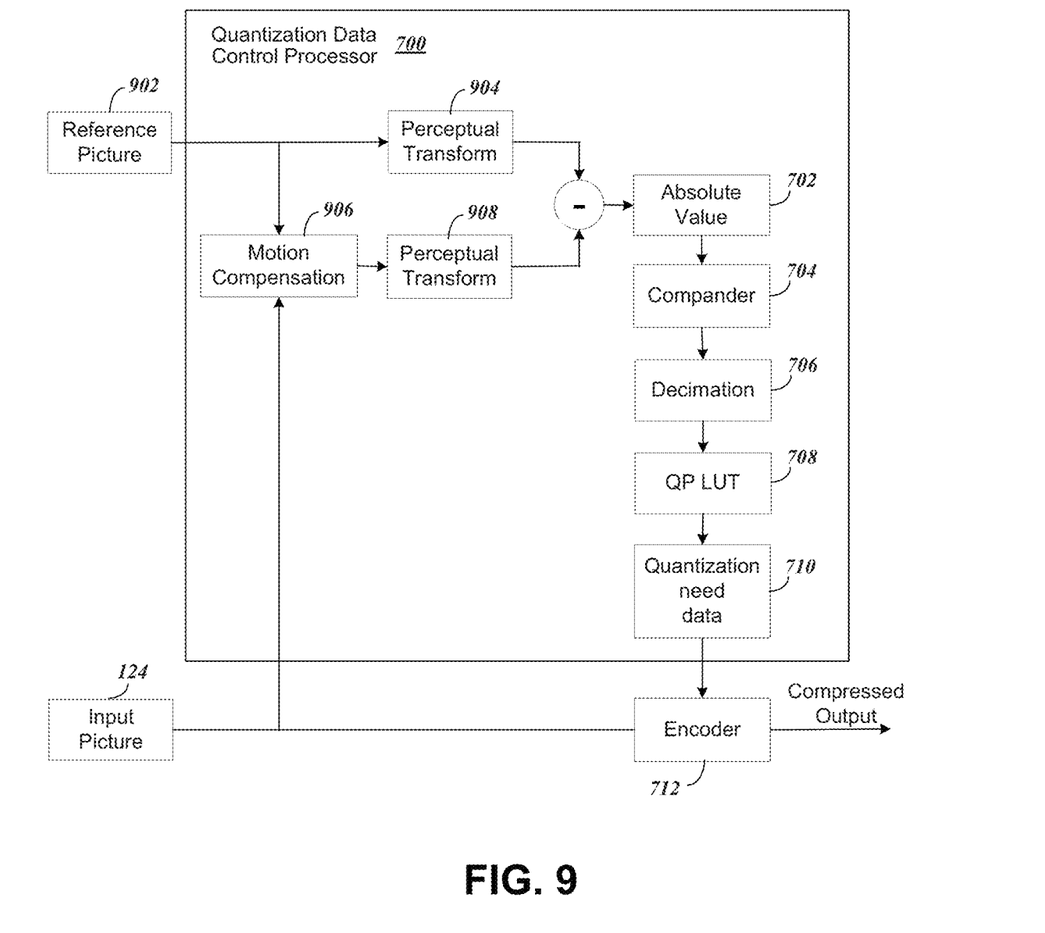
FIG. 9 shows modifications to the system of FIG. 7 to provide motion compensation.

FIG. 9 shows modifications to the system of FIG. 7 to provide motion compensation. The system of FIG. 9 uses a reference picture 902 that is separate from a quantization data control processor 900. The reference picture 902, as with previous figures, may be a picture that has previously been processed, or alternatively it can be an unprocessed picture. The quantization control processor 900 may be a single PVP, or a PVP in combination with other processors.

In FIG. 9, the reference picture from block 902 and input picture from block 124 are provided to a motion compensation determination block 906. The motion compensation determination block 906 determines a motion compensated difference between the original input picture from block 124 and reference picture from block 902, and can function similar to the motion compensation engine 302 described with respect to FIG. 3.

A perceptual transform block 904 receives the reference picture block 902 output, while another perceptual transform block 908 receives the motion compensated difference output from motion compensation block 906. The perceptual transform blocks 904 and 908 applies a model of the human visual system that may include a model of human spatial perceptibility and a model of human temporal perceptibility as described previously for block 701 of FIGS. 7 and 8. The output the perceptual transform blocks 904 and 908 are then subtracted and provided to an absolute value block 702. In previous systems where perceptual transforms are performed to clean a picture, the motion compensated output was summed (rather than subtracted) from the reference picture output, as the present system looks for a difference between pictures to determine quantization parameters instead of cleaning a picture. The system of FIG. 9 then proceeds after the absolute value block 702 in a manner similar to FIG. 7 to determine quantization data values to provide to encoder 712. In one embodiment all of the calculations performed in the perceptual transform block 701, compander 704 and absolute value block 702 can be performed in a PVP.

Figure 10:
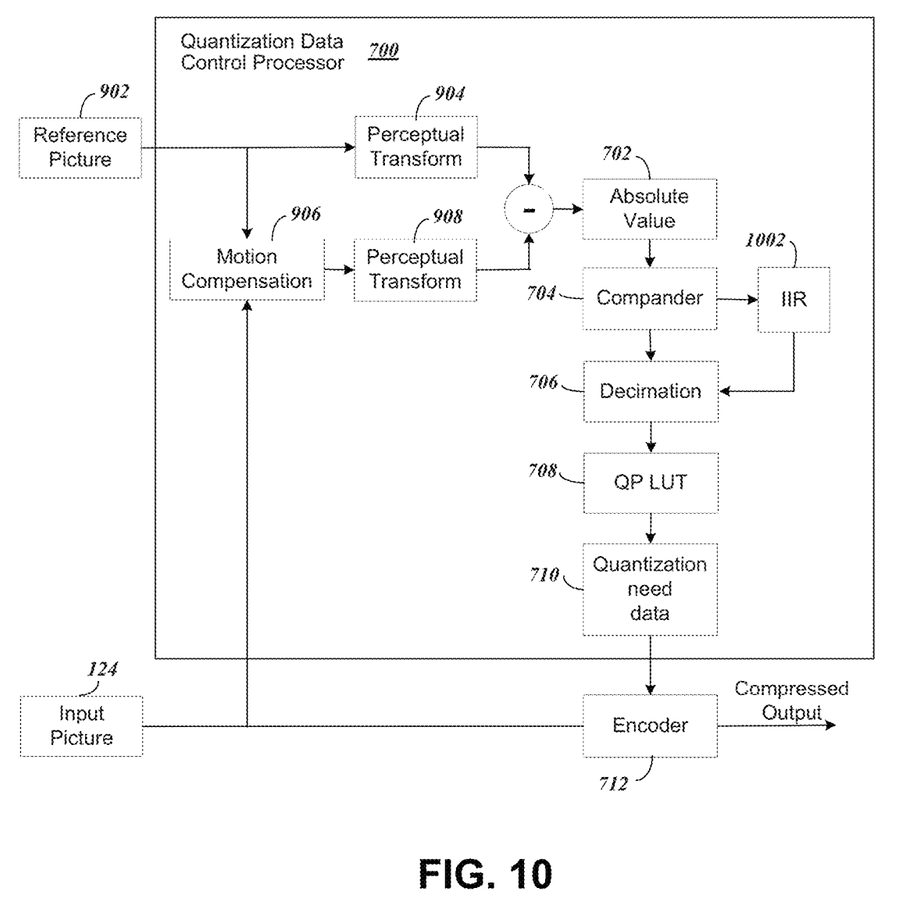
FIG. 10 modifies the system of FIG. 9 by adding an infinite impulse response (IIR.

FIG. 10 modifies the system of FIG. 9 by adding an infinite impulse response (IIR) block 1002. As described with respect to FIG. 8, the IIR block 802 looks at a previous picture to the picture being encoded and creates a more gradual change from the previous picture.

Figure 11:
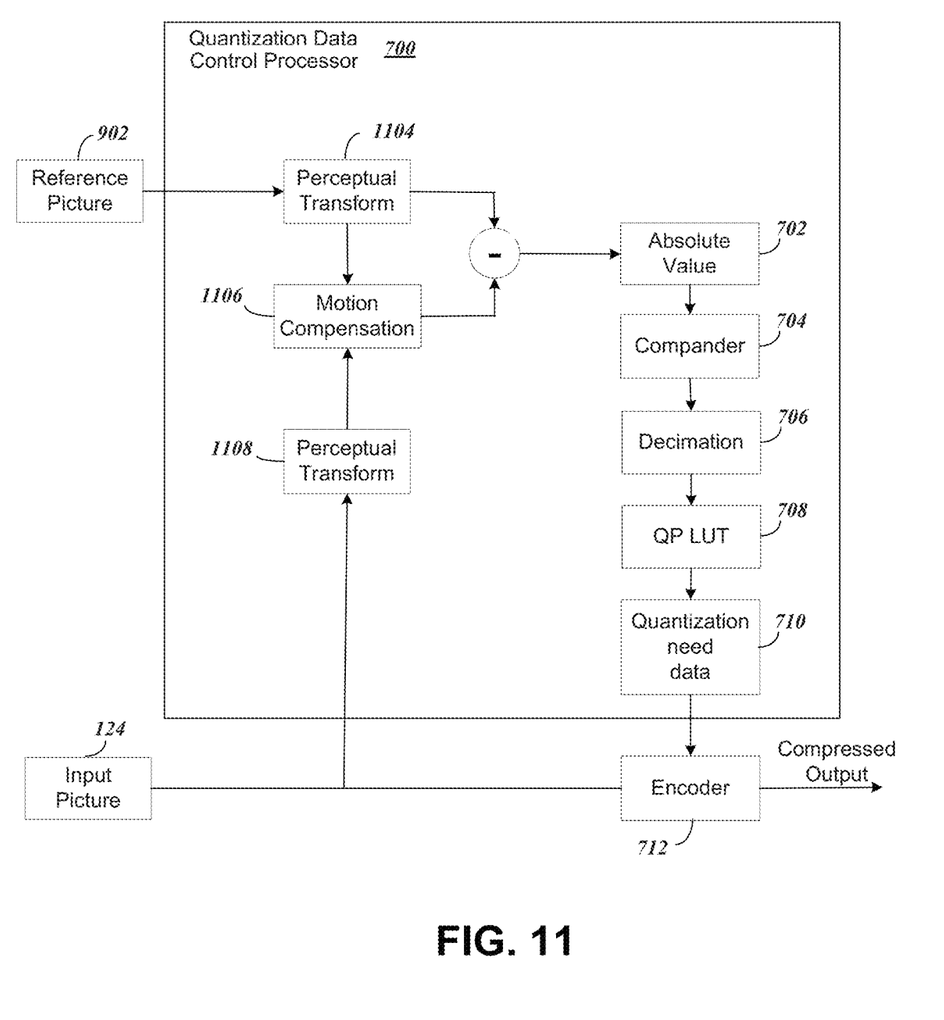
FIG. 11 modifies the system of FIG. 10 by applying a perceptual transform to the reference and original pictures prior to motion compensation.
Figure 12:
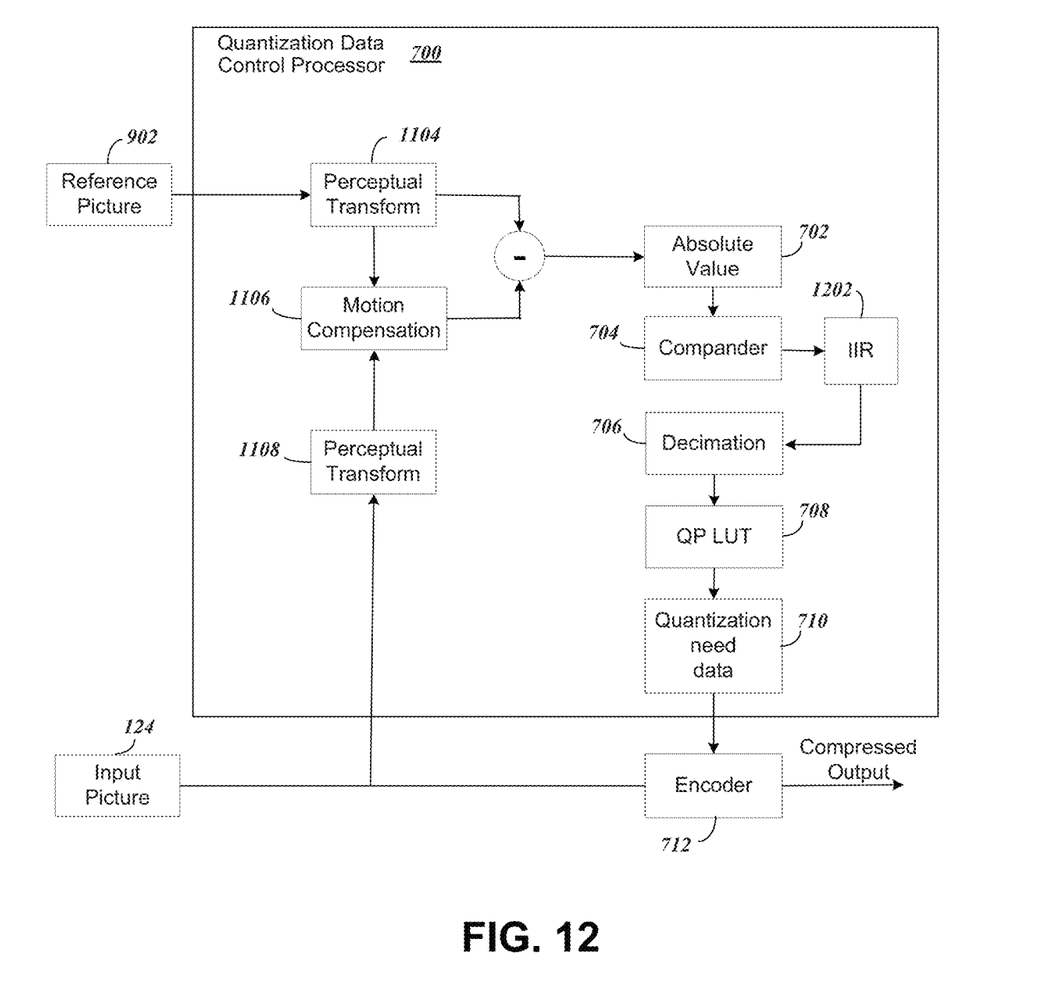
FIG. 12 modifies the system of FIG. 11 by adding an infinite impulse response (IIR)

FIG. 11 modifies the system of FIG. 10 by applying a perceptual transform to the reference and original pictures prior to motion compensation. As opposed to the system of FIG. 10, in FIG. 11, a perceptual transform is applied in block 902 to the reference picture from block 902 before motion compensation is performed in block 1106. Similarly, the original input picture from block 124 is provided through a perceptual transform block 1108 before the motion compensation block 1106. The motion compensation takes a difference of the transformed inputs and is subtracted from the output of block 1104 to provide to the absolute value block 702. By transforming prior to motion compensation, human eye attraction patterns can be more discernable. FIG. 12 modifies the system of FIG. 11 by adding an infinite impulse response (IIR) block 1102.

Embodiments of the present invention provide a number of improvements over previous systems. These improvements include: (1) Improved compression efficiency. (2) Improved visual quality. (3) Can use existing motion estimation and compensation components, such as those provided in a PVP. (4) Does not require change to a decoder or a set top box. (5) Can be used as a pre-analysis process to generate "hints" for existing compression ASICs used in encoders. (6) The major processing step of generating IPeG spatial detail maps and spatial-temporal perceptual weighting maps is already implement in current PVPs.

Figure 13:
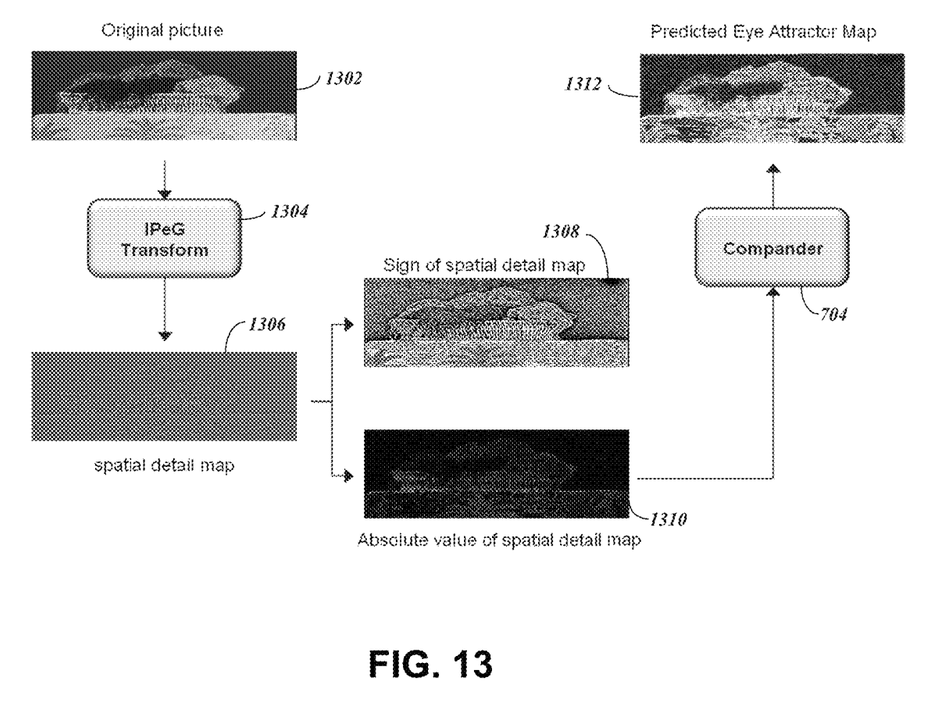
FIG. 13 shows representative images to illustrate operation of components of systems according to embodiments of the present invention.

For reference, FIG. 13 shows representative images to illustrate operation of components of systems according to embodiments of the present invention. A design image 1302 is shown as an input original picture provided to the system. A spatial detail image 1306 is shown provided from an IPeG Transform device 1304, wherein the IPeG transform can be provided by a component such as the perceptual transform component 701 shown in FIG. 7. Taking the absolute value of the spatial detail image 1306 provides image 1310, wherein the absolute value can be performed by the component 702 of FIG. 7. An image created from taking the sign of the spatial detail image 1306 is shown as 1308 for comparison with image 1310. The absolute value image 1310 is then provided through compander 704 to provide a predicted eye attractor image 1312.

Although the present invention has been described above with particularity, this was merely to teach one of ordinary skill in the art how to make and use the invention. Many additional modifications will fall within the scope of the invention, as that scope is defined by the following claims.

What is claimed:

1. A system for allocating bits for video signal processing and compression, the system comprising:
an input module configured to receive an original picture in a video sequence;
a noise reducer to modify the original picture in a video signal to improve compression efficiency wherein the noise reducer configured to:
receive an original picture from the input module;
obtain a perceptual significance pixel map for the original picture using predictions of eye tracking;
provide an absolute value for numbers in the significance pixel map;
perform companding to reduce the determined absolute value of the pixel values to values ranging from zero to one to produce a weighting map;
apply the weighting map to the original picture to reduce noise in the original picture selectively in a pixel-by-pixel basis to produce a noise-reduced picture;
output the noise-reduced picture;
output the weighting map to a control processor; and
a control processor configured to:
receive the weighting map from the noise reducer;
receive a map of transform-quantization units that specifies size and location of transform-quantization units to be processed by an encoder;
calculate the average value of the weighting map within each transform-quantization unit to produce a decimated weighting map;
determine a quantization parameter for each transform-quantization unit from a quantization parameter (OP) look up table (LUT) that assigns decimated weighting map values to corresponding quantization parameter values;
provide the QP LUT table values as metadata to enable compression of the original picture in a manner so that bits are allocated to pixels in a macroblock according to the predictions of eye tracking; and
an encoder having a first input receiving the original video from the input module, and a control input for receiving the quantization metadata and using the quantization metadata to encode the original video.

2. The system of claim 1, wherein local quantization strength is adjusted so that the perceptual significance map has pixels within an image identified as perceptually significant receiving preferentially more bits than areas not identified as perceptually significant.

3. The system of claim 1, wherein the prediction of eye tracking comprises a prediction of visual attention.

4. The system of claim 3, wherein the prediction of visual attention comprises creating an eye attractor map that models both spatial and temporal aspects of the human vision system.

5. The system of claim 3, wherein the prediction of visual attention comprises creating an eye attractor map that models either spatial or temporal aspects of the human vision system.

6. The system of claim 5, wherein the eye attractor map is generated in a perceptual video processor (PVP).

7. The system of claim 6, wherein the eye attractor map is generated using a spatial temporal function of an adaptive preservation process.

8. The system of claim 6, wherein the control processor includes the PVP processor to perform the step of obtaining a perceptual significance pixel map that is separate from one or more processors included in the control processor that are used to perform other functions of the control processor.

9. The system of claim 1, wherein the decimation is performed by converting each block of the companded spatial detail values to a quantization-need value to provide a one-to-one mapping between quantization-need values and QP LUT values.

10. The system of claim 9, wherein the decimation is performed by averaging values for groups of the pixels.

11. The system of claim 1, wherein prior to the decimation the control processor is configured to:
perform an input impulse response (IIR) on the companded pixel values to provide a time average gradual change from a previous picture for encoding prior to the pixel values of the current picture.

12. A method for video processing comprising:
receiving an original picture from the input module;
obtaining a perceptual significance pixel map for the original picture using predictions of eye tracking;
providing an absolute value for numbers in the significance pixel map;
performing companding to reduce the determined absolute value of the pixel values to values ranging from zero to one to produce a weighting map;
applying the weighting map to the original picture to reduce noise in the original picture selectively in a pixel-by-pixel basis to produce a noise-reduced picture;
receiving a map of transform-quantization units that specifies size and location of transform-quantization units to be processed by an encoder;
calculating the average value of the weighting map within each transform-quantization unit to produce a decimated weighting map;
determining a quantization parameter for each transform-quantization unit from a quantization parameter (QP) look up table (LUT) that assigns decimated weighting map values to corresponding quantization parameter values;
providing the QP LUT table values as metadata to an encoder to enable the encoder to perform compression of the original picture in a manner so that bits are allocated to pixels in a macroblock according to the predictions of eye tracking.

13. The method of claim 12, wherein the prediction of visual attention comprises creating an eye attractor map that models either spatial or temporal aspects of the human vision system.

14. The method of claim 12, further comprising:
performing an input impulse response (IIR) on the companded pixel values to provide a time average gradual change from a previous picture for encoding prior to the pixel values of the current picture.

15. The system of claim 1, wherein the video processing module comprises a system for adaptively reducing non-noise spatial detail in video to selectively soften features in a picture according to a weighting map derived from significance pixel map.

16. The system of claim 1, wherein the video processor module comprises an adaptive detail reducer (ADR).

17. The system of claim 1, wherein the weighting map for the perceptual significance pixel map is transmitted to a remote encoder over a communications network.

18. The system of claim 1, wherein the perceptual significance pixel map is obtained from predictions of eye tracking from both an original picture and a reference picture.

19. The system of claim 18, wherein motion compensation is applied to the perceptual significance pixel map for the original picture or the reference picture.

* * * * *